(12) United States Patent
Carboneri et al.

(10) Patent No.: US 7,597,013 B2
(45) Date of Patent: Oct. 6, 2009

(54) DEVICE AND METHOD FOR DETECTING THE PRESENCE OF TEST GAS

(75) Inventors: Roberto Carboneri, Settimo Torinese (IT); Sandro Vittozzi, Turin (IT)

(73) Assignee: Varian, S.p.A., Leini, Turin (IT)

( * ) Notice: Subject to any disclaimer, the term of this patent is extended or adjusted under 35 U.S.C. 154(b) by 125 days.

(21) Appl. No.: 11/522,686

(22) Filed: Sep. 18, 2006

(65) Prior Publication Data

US 2007/0062257 A1 Mar. 22, 2007

(30) Foreign Application Priority Data

Sep. 20, 2005 (EP) .................................. 05425658

(51) Int. Cl.
*G01N 1/24* (2006.01)
*G01N 1/40* (2006.01)

(52) U.S. Cl. .............. 73/863.51; 73/863.22; 73/863.23; 73/863.41

(58) Field of Classification Search ................. 73/23.3, 73/23.31–23.34, 31.01–31.05, 31.07, 40–49.8, 73/866.5, 863.11, 863.21, 863.22, 863.23, 73/863.41, 863.51
See application file for complete search history.

(56) References Cited

U.S. PATENT DOCUMENTS

| 2,983,587 | A | * | 5/1961 | May et al. ..................... 436/141 |
| 3,505,180 | A |   | 4/1970 | Brogden |
| 4,796,475 | A | * | 1/1989 | Marple ..................... 73/863.22 |
| 5,027,643 | A | * | 7/1991 | Jenkins ..................... 73/23.39 |
| 5,040,424 | A | * | 8/1991 | Marple et al. ............. 73/863.23 |
| 5,117,190 | A | * | 5/1992 | Pourprix ..................... 324/452 |
| 5,404,762 | A | * | 4/1995 | Rodgers et al. .......... 73/863.25 |
| 5,661,229 | A |   | 8/1997 | Bohm et al. |
| 5,786,529 | A |   | 7/1998 | Voss et al. |
| 5,898,114 | A | * | 4/1999 | Basch et al. ............. 73/863.23 |
| 6,378,385 | B1 | * | 4/2002 | Bowers ................... 73/863.12 |
| 6,527,835 | B1 | * | 3/2003 | Manginell et al. ............. 96/102 |
| 6,565,638 | B1 | * | 5/2003 | Sugita et al. ................... 96/413 |
| 6,823,714 | B2 | * | 11/2004 | Megerle ..................... 73/23.2 |
| 7,458,284 | B2 | * | 12/2008 | Shih et al. ................ 73/863.23 |
| 2002/0104967 | A1 | * | 8/2002 | Kouznetsov ........... 250/339.13 |
| 2004/0069046 | A1 | * | 4/2004 | Sunshine et al. ........... 73/23.34 |
| 2004/0077093 | A1 | * | 4/2004 | Pan .............................. 436/37 |
| 2004/0149131 | A1 |   | 8/2004 | Carboneri et al. |
| 2005/0150274 | A1 | * | 7/2005 | Vittozzi et al. ................. 73/40 |
| 2006/0272393 | A1 | * | 12/2006 | Jenkins ..................... 73/31.03 |

FOREIGN PATENT DOCUMENTS

EP 0352 371 B2 3/1996
JP 06347384 A * 12/1994

* cited by examiner

*Primary Examiner*—David A. Rogers
(74) *Attorney, Agent, or Firm*—Bella Fishman

(57) ABSTRACT

A device and a method provide a detection of a presence of a test gas. The device comprises a vacuum chamber connected to a vacuum pump equipped with an electronic power supply unit. At least one portion of the chamber is separated from a surrounding outside environment by a membrane selectively permeable to the test gas. A gas flow from the outside environment is guided forcefully over the surface of the membrane via a flow conveyor, which comprises an inlet duct, a diffuser and an outlet duct. The presence of any test gas is detected by the changes in the electrical current to the vacuum pump provided by the power supply.

20 Claims, 3 Drawing Sheets

DEVICE AND METHOD FOR DETECTING THE PRESENCE OF TEST GAS

CROSS-REFERENCE TO RELATED APPLICATION

The subject application claims priority of the European Patent Application No. 05425658.

FIELD OF THE INVENTION

The present invention relates to a device and a method for detecting the presence of a test gas. The device and the method according to the invention can be advantageously employed in the field of leak detection, in order to detect gas leaks from ducts, reservoirs and the like.

BACKGROUND OF THE INVENTION

The contemporary detectors in the field of leak detection, use is commonly made of detectors comprising a vacuum chamber equipped with a selectively permeable membrane through which only a predetermined gas can pass into the vacuum chamber, with the pressure inside the chamber has been made significantly lower than the outside pressure.

The membranes of known detectors are generally made of quartz or glass with high silica contents, which materials are permeable to helium if they are brought to a suitable temperature, typically at least 300° C. To bring the membrane to such a temperature, an electrical resistor is generally associated with such a membrane. As an alternative to helium, hydrogen can be used as a test gas; however helium is preferable since it is a harmless inert gas, which can be found in very small amounts in the atmosphere, whereby measurement errors are minimised.

The membranes commonly employed have the shape of a capillary with an electrical resistor helically wound around it. A test gas detector, which is equipped with a capillary-shaped membrane, is disclosed, for instance, in the European Patent No. 352,371 assigned to the Assignee of the present invention.

More recently, planar membranes have been developed. Those membranes may have a composite structure, where a thin layer of a material selectively permeable to a test gas, is associated with a supporting layer, impermeable to the test gas and ensuring structural strength. The supporting layer has openings or windows at which the permeable layer is exposed on both faces and through which the test gas can pass into the vacuum chamber. An example of such a membrane is disclosed in the U.S. Pat. No. 3,505,180.

As an alternative, the membranes may have a homogeneous structure and made of a material selectively permeable to test gas. In this case, the membranes have thicker portions ensuring structural stiffness of the membrane and thinner portions locally ensuring high permeability to the test gas. An example of such a membrane is disclosed in the US Patent Publication US 2004/0149131 in assigned the name of the Applicant of the present invention.

Referring to FIG. 1, a prior art device for detecting the presence of test gas is schematically shown. The device, generally shown at 100, comprises a vacuum chamber 102 formed by a hollow cylindrical body 104, one end of which is connected with a suction port of a vacuum pump 106, for instance an ion pump. The other end of chamber 102 is separated from the outside environment by a planar membrane 108 selectively permeable to gases. An electrical resistor, which allows bringing said membrane to a temperature at which it becomes permeable to test gas (e.g. 300° C. for quartz membranes), is deposited on membrane 108, preferably on the face directed towards the outside of chamber 102. The apparatus formed in that manner is placed in the environment to be tested: if test gas is present in the surrounding environment, for instance due to a leak from an enclosure into which said gas was previously introduced, gas enters chamber 102 through membrane 108 and is pumped off therefrom by means of vacuum pump 106. An electronic power supply unit 110 connected with pump 106 is capable of detecting the presence, if any, of test gas inside chamber 102 from the variation of the electrical current absorbed by the pump with respect to vacuum conditions.

The U.S. Pat. No. 5,786,529 discloses a test gas detecting device comprising a chamber, wherein a space is defined for housing a selectively permeable membrane; inlet and outlet ducts for introducing and evacuating the gas in and from the housing are also provided which however does not define any specific path for the gas towards the membrane surface.

Even if use of planar membranes is a significant technical progress over capillary-shaped membranes, planar membrane detectors also are not wholly satisfactory, especially for applications in the technologically most sophisticated fields, where the presence of even minimum amounts of test gas is to be detected. These detectors do not allow attaining a sensitivity level as required by such applications.

Thus, it is an object of the present invention to provide a device and a method for detecting the presence of a test gas, having increased sensitivity with respect to the prior art.

Moreover, as discussed above, the membranes used are permeable to test gas only at high temperatures (for instance, above 300° C. for quartz membranes). Yet, in general, the detector is located in enclosures at ambient temperature, so that the surrounding atmosphere tends to cool the membrane, thus decreasing sensitivity thereof. Therefore, in order to ensure a sufficient sensitivity of the membrane, the power of the heating means associated therewith is to be increased, resulting in increase of the consumption of energy.

Considering that in general, the detectors are battery-powered portable devices, this is a significant disadvantage, since increased energy consumption results in reduced endurance.

Thus, it is another object of the present invention to provide a device and a method for detecting the presence of test gas, which result in reduced energy consumption and, consequently, in increased endurance with respect to the prior art.

Lastly, in the prior art devices, the portion of the membrane surface that is actually permeable to test gas, and therefore utilisable to detect the presence of test gas, is a quite small fraction of the overall surface of the membrane. Test gas molecules coming into contact with the permeable portion, and being consequently detected by the detector, are a correspondingly reduced fraction of the whole of test gas molecules present in the environment surrounding the detector, which is detrimental to the detector sensitivity.

Therefore, it is a further object of the present invention to overcome the above drawback, by providing a device and a method for detecting the presence of test gas, having further increased sensitivity with respect to the prior art.

The above and other objects are achieved by the device and the method for detecting the presence of test gas as claimed in the appended claims.

SUMMARY OF THE INVENTION

To address the foregoing problems the present disclosure provides device and method where a gas conveyor is associated with the selectively permeable membrane. As a result, the sensitivity of the device is considerably increased, due to ability at the conveyor to guide gas present in the environment to be tested containing test gas directly onto said membrane.

According to a preferred embodiment of the invention, the gas flow from the outside environment is preheated while passing through the conveyor, improving the sensitivity of the device. At the same time, preheating the incoming gas flow allows for limiting the power of the heater of the selectively permeable membrane, thereby reducing energy consumption of the detecting device and, in case of portable devices, increasing endurance thereof.

The gas flow from the outside environment, after having flowed over the surface the selectively permeable membrane, is preferably recirculated inside the conveyor before being exhausted again to the outside: thus, the gas flow transfers its residual heat to the incoming gas flow, thereby taking part in the preheating flow and assisting in further reducing energy consumption of the detecting device.

Advantageously, according to another preferred embodiment of the invention, the gas conveyor includes one or more channels specifically directing gas coming from the outside environment and possibly containing test gas towards the high permeability regions of the selectively permeable membrane, thus allowing optimising the detector sensitivity.

BRIEF DESCRIPTION OF THE DRAWINGS

The aforesaid and other advantages will become apparent from the description of preferred embodiments of the invention, given by way of non-limiting examples and disclosed hereinbelow with reference to the accompanying drawings, in which.

DETAILED DESCRIPTION OF THE INVENTION

Figure 2:
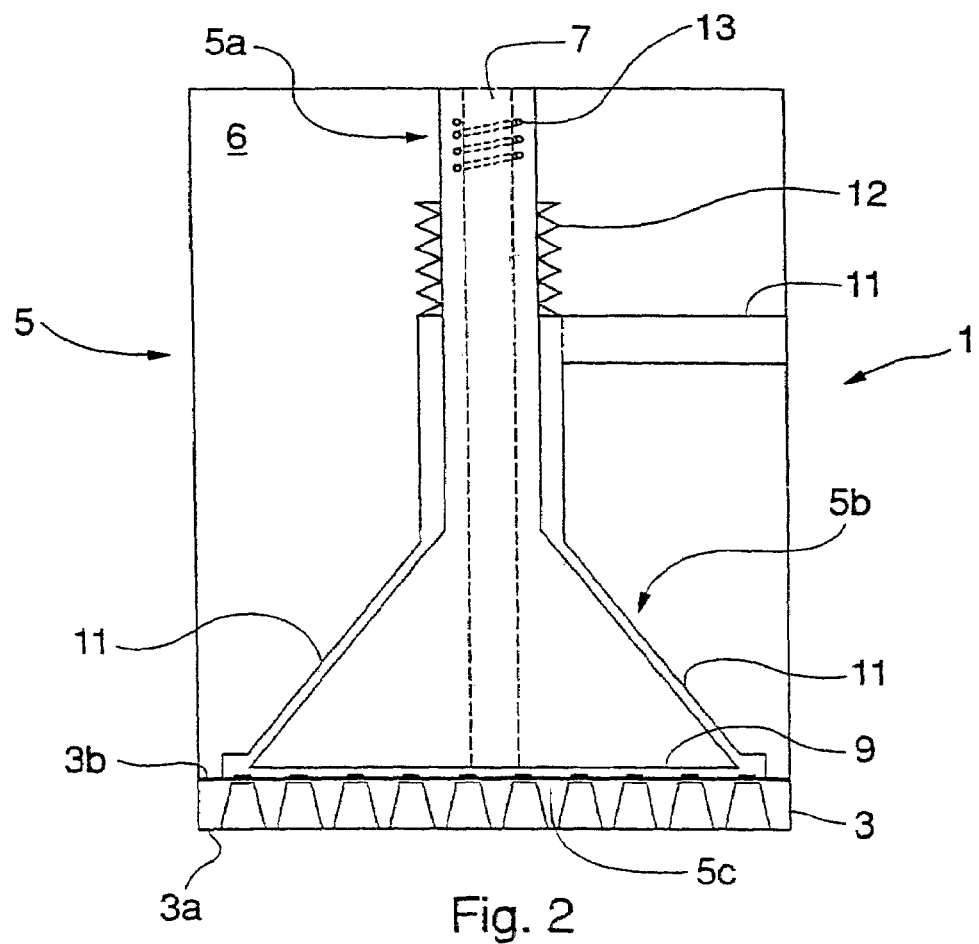
FIG. 2 is a partial longitudinal cross-sectional view of the device for detecting the presence of test the gas according to a first embodiment of the invention.

Referring to FIG. 2, a portion of device 1 for detecting the presence of test gas according to the invention is shown.

Figure 1:
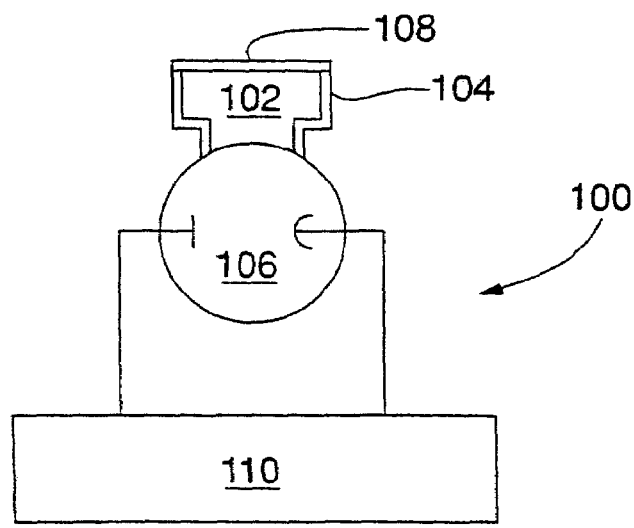
FIG. 1 shows a prior art device for detecting the presence of a test gas.

The device comprises a vacuum chamber, one end of which is coupled with the suction port of a vacuum pump, for instance a ion pump, whereas the other end of the chamber is separated from the outside environment by a planar membrane 3 selectively permeable to test gas. For sake of simplicity, the vacuum chamber and coupled thereto vacuum pump are not shown in FIG. 2, since they are well known and are similar to what has been shown in FIG. 1.

According to the invention, a flow conveyor 5 is provided on face 3b of selectively permeable membrane 3, which is opposite to face 3a facing the vacuum chamber. The conveyor allows for directing a forced gas flow from the outside environment directly onto the surface of membrane 3.

In this manner, the sensitivity of membrane 3 is increased with respect to the case where the membrane is simply placed into the environment to be tested.

The flow conveyor 5 generally comprises an inlet duct 7, leading gas from the outside environment to membrane 3; a diffuser 9, communicating with the inlet duct and facing and contacting the surface of membrane 3. The diffuser allows for distributing the incoming gas flow over the surface of membrane 3. An outlet duct 11, communicates with the diffuser 9. The gas flow is exhausted through the outlet duct to the outside environment after having flowed over the surface of membrane 3.

The flow conveyor 5 is associated with a pump, for instance a membrane pump (not shown) to make a gas forcedly flow from the surrounding environment successively through inlet duct 7, diffuser 9 and outlet duct 11, the pump may be positioned within upstream inlet duct 7 or downstream outlet duct 11.

In the illustrated embodiment, flow conveyor 5 is housed within a casing 6, has the shape of an inverted funnel, which comprises a cylindrical portion 5a joined with the small base of a conical portion 5b, and is suitably secured to casing 6 by means of a threaded coupling 12.

The inlet duct 7 extends along the axis of cylindrical portion 5a and conical portion 5b of the funnel-shaped conveyor, and ends at the great base 5c of the conical portion, which faces membrane 3 and has substantially the same diameter as the membrane 3. At the large base, conveyor 5 is coupled with the membrane 3 along its outer circumference (for example, by gluing).

At base 5c of the conical portion of conveyor 5, a thin hollow space is provided where inlet duct 7 ends and which extends over the whole base 5c of conveyor 5. The hollow space forms diffuser 9 of conveyor 5. In this respect it should be noted that, since said diffuser extends in a plane substantially perpendicular to the axis of inlet duct 7, the gas flow coming from the duct is uniformly diffused over diffuser 9 and, consequently, over surface 3b of membrane 3 below.

The outlet duct 11 comprises of a hollow space that extends from the outer circumference of base 5c along the whole outer surface of conical portion 5b of conveyor 5 and along part of the outer surface of cylindrical portion 5a of conveyor 5, before going out of casing 6 to exhaust gas into the surrounding atmosphere.

The inverted funnel geometrical shape of conveyor 5 is particularly advantageous, since it avoids dispersion of the gas flow incoming along inlet duct 7 and allows uniformly distributing the gas flow over the surface of membrane 3.

Figure 3:
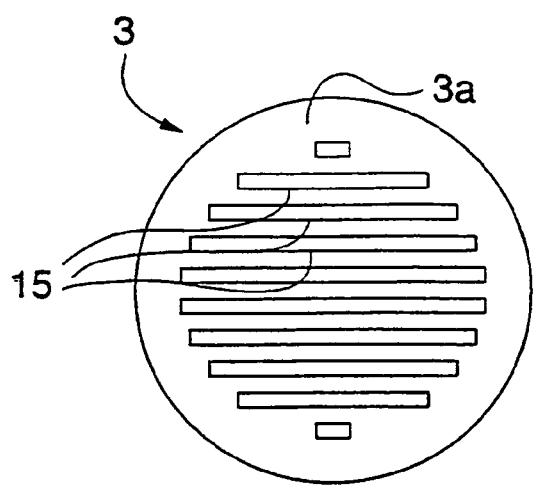
FIG. 3 is a bottom view of the selectively permeable membrane of the device shown in FIG. 2.
Figure 4:
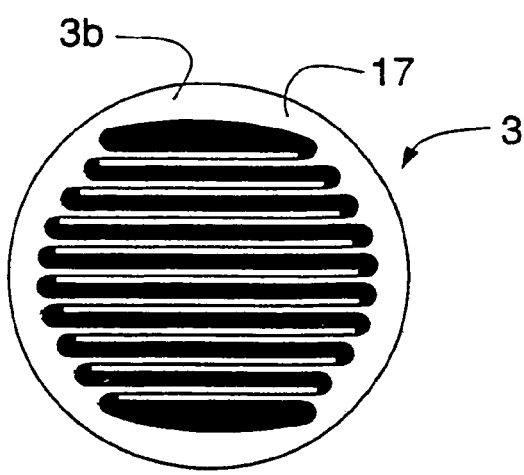
FIG. 4 is a top view of the selectively permeable membrane of the device shown in FIG. 2.

This membrane is depicted in more detail in FIGS. 3 and 4 and is preferably made in accordance with the teaching described in the US patent publication US 2004/0149131.

The membrane 3 comprises a homogeneous disc-shaped body, wholly made of a material selectively permeable to a test gas. Blind cavities 15 are formed on face 3a of the disc-shaped body facing the vacuum chamber defining a plurality of reduced thickness regions on membrane 3. The reduced thickness regions form the portion of membrane 3 actually permeable to test gas and hence utilisable for detecting the presence of the gas, whereas the remaining portion of the membrane has the only task of conferring a sufficient structural stiffness, permeation of test gas through the portion being negligible. Cavities 15 are arranged so as to leave an outer annulus of membrane 3 unaffected, to allow for coupling the membrane with the vacuum chamber on the one side and with the flow conveyor 5 on the other side.

By way of example, in case helium is used as a test gas, the material used to manufacture the membrane will preferably be quartz, the overall thickness of the disc-shaped body will preferably be in the range 800 to 900 μm and, at blind cavities 15, the thickness of the membrane will be 5 to 50 μm. A membrane heating device is provided on face 3b of membrane 3 facing conveyor 5.

The heating device comprises an electrical resistor 17 adhering to the face 3b of the membrane 3 and equipped with a pair of contacts for connection to an electric current source (not shown). Advantageously, the resistor 17 passes through or surrounds all reduced thickness regions of membrane 3 resulting from the provision of blind cavities 15, so as to selectively heat the regions more permeable to the test gas.

Turning now back to FIG. 2, since the devices for detecting the presence of test gas are usually introduced into enclosures at ambient temperature (about 25° C.), as discussed above, in order to reduce the cooling effect of the surrounding atmosphere on selectively permeable membrane 3, flow conveyor 5 is advantageously equipped with a device for preheating gas coming from the outside environment before such gas contacts membrane 3.

The heating device includes, in the illustrated example, an electrical resistor 13, wound around a portion of the duct 7, preferably along the cylindrical portion of funnel-shaped conveyor 5.

Due to the preheating of the incoming gas flow, the cooling effect on membrane 3 is significantly limited, so that a corresponding reduction can be achieved in the power absorbed by electrical resistor 17 in order to keep membrane 3 at a predetermined temperature, higher than the threshold below which permeability of the membrane is negligible.

In order to limit energy consumption of electrical resistors 13 and 17, the gas flow outgoing through outlet duct 11 can be advantageously employed to assist in preheating the gas flow incoming through inlet duct 7.

Figure 5:
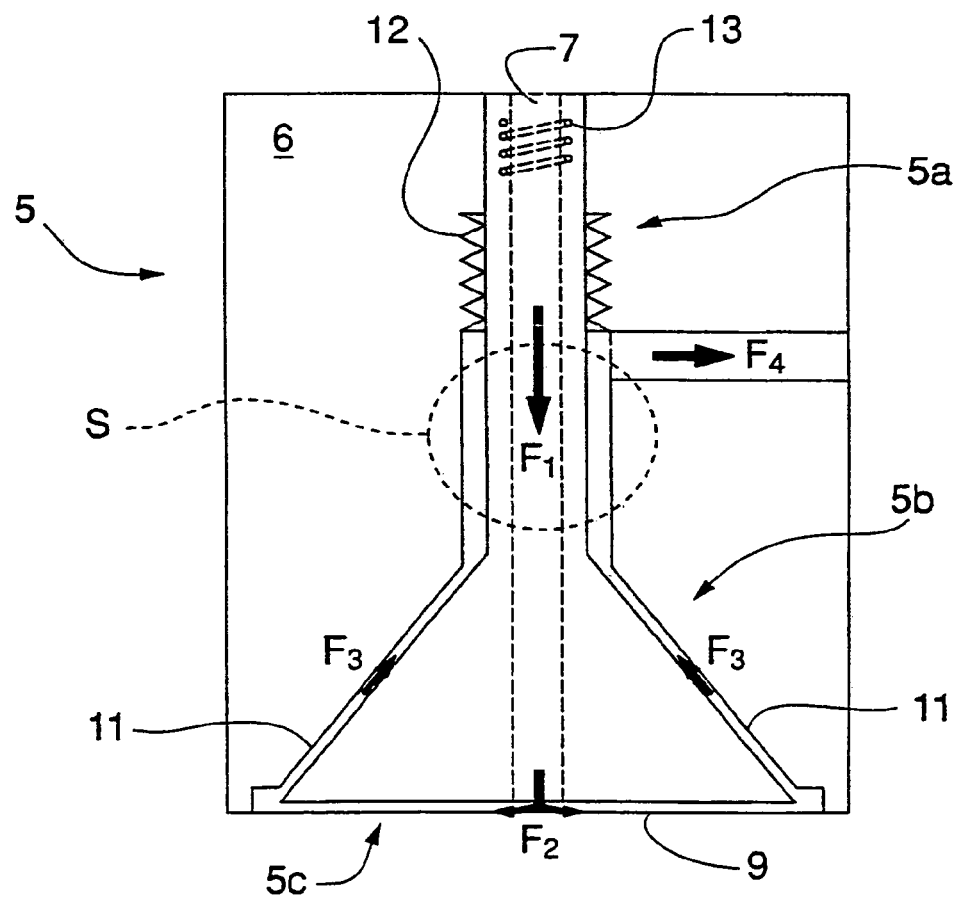
FIG. 5 schematically shows the direction of gas flow within a flow conveyor in the device shown in FIG. 2.

As shown in FIG. 5, the incoming gas flow, partly preheated by resistor 13 but substantially at low temperature, flows along inlet duct 7 (arrow $F_1$) down to diffuser 9. At the diffuser 9, the gas flow is uniformly distributed over membrane 3 (arrow $F_2$), which is at high temperature, about 550° C. After having contacted the surface of membrane 3 and having received heat therefrom, the gas flow, at a temperature of about 120° C., enters outlet duct 11 (arrows $F_3$) to be exhausted to the outside environment (arrow $F_4$).

In order to recover heat from the outgoing gas flow, outlet duct 11 surrounds inlet duct 7 along cylindrical portion 5a of conveyor 5 (and more particularly at the region denoted by S in FIG. 5). Thus, a counter-current heat exchanger is obtained, where the (upward) gas flow outgoing through outlet duct 11 transfers part of its heat to the (downward) gas flow incoming through inlet duct 7, thereby contributing to preheating the flow.

Due to heat recovery from the outgoing gas flow, the power absorbed by electrical resistor 17 associated with membrane 3 (or, in the alternative, the power absorbed by electrical resistor 13 associated with inlet duct 7) can be further decreased.

As mentioned above, reducing the power absorbed by resistors 13, 17 is particularly advantageous in case of battery-powered portable detecting devices, in that this results in a longer endurance of detecting device 1.

Another advantage related to heat recovery from the gas flow outgoing through outlet duct 11 is that the gas flow, after having transferred part of its heat to the incoming gas flow, is at a temperature of about 60° C., a temperature at which gas can be exhausted to the outside environment in full compliance with the existing regulations about safety and environmental impact. Should heat of the outgoing gas flow not be recovered, the gas flow would be at much higher temperature (about 120° C.) and thus a proper heat dissipator would have to be provided along outlet duct 11.

Thus, heat recovery from the outgoing gas flow not only entails energy saving while the detecting device is operating, but also substantial saving of manufactory cost.

From the above description it is apparent that, even though in principle flow conveyor 5 can be manufactured by using any material, use of materials with low thermal conductivity, such as, for instance, stainless steel or ceramic materials, is however advantageous in order to avoid heat dispersion.

Figure 6:
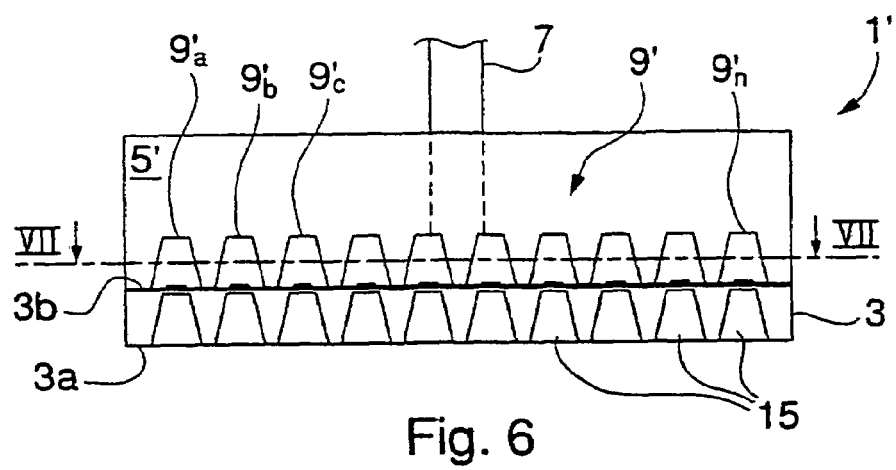
FIG. 6 is a partial longitudinal cross-sectional view of the device for detecting the presence of test gas according to a second embodiment of the invention.
Figure 7:
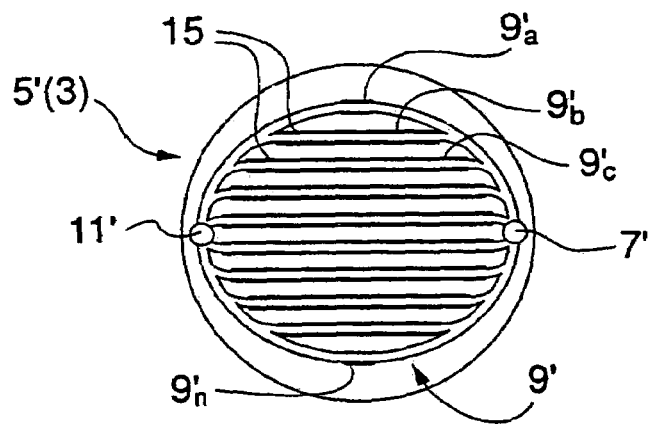
FIG. 7 is a cross-sectional view of the device shown in FIG. 6 taken along line VII-VII.

Turning now to FIGS. 6 and 7, device 1' for detecting the presence of test gas according to a second embodiment of the invention is schematically shown. Also in FIGS. 6 and 7 the vacuum chamber separated from the outside environment by membrane 3 and the associated vacuum pump have not been shown, since they are built in accordance with the prior art.

According to that second embodiment, flow conveyor 5' comprises of a disc having substantially the same diameter as selectively permeable membrane 3 and superimposed onto face 3b of the membrane opposite to face 3a facing the vacuum chamber.

Like in the previously described embodiment, the flow conveyor 5' comprises: an inlet duct 7', leading a gas flow from the outside environment to selectively permeable membrane 3; a diffuser 9', communicating with the inlet duct 7' and facing and contacting the surface of membrane 3, wherein diffuser allows for distributing the incoming gas flow over the surface of membrane 3; an outlet duct 11', which communicates with the diffuser 9' and through which the gas flow is exhausted to the outside environment.

Flow conveyor 5' is associated with a pump, for instance a membrane pump (not shown) to make a gas forcedly flow from the surrounding environment successively through inlet duct 7', diffuser 9' and outlet duct 11', the pump is positioned either upstream inlet duct 7' or downstream outlet duct 11'.

According to the second embodiment, diffuser 9' does not extend over the whole surface of membrane 3 below, but it comprises a plurality of channels 9'a, 9'b, 9'c . . . 9'n that lead off from the end of inlet duct 7', extending over the surface of membrane 3 below and joining again at the end of outlet duct 11', diametrically opposed to the end of inlet duct 7'.

Advantageously, the channels 9'a, 9'b, 9'c . . . 9'n are so constructed that they are superimposed onto the reduced thickness regions in membrane 3 resulting from the provision of hollows 15, that is onto the regions that are actually permeable to test gas.

The sensitivity of the detecting device is thus significantly increased, since the gas flow possibly containing test gas is directed only onto the portion of membrane 3 that is actually permeable to the test gas.

Figure 8:
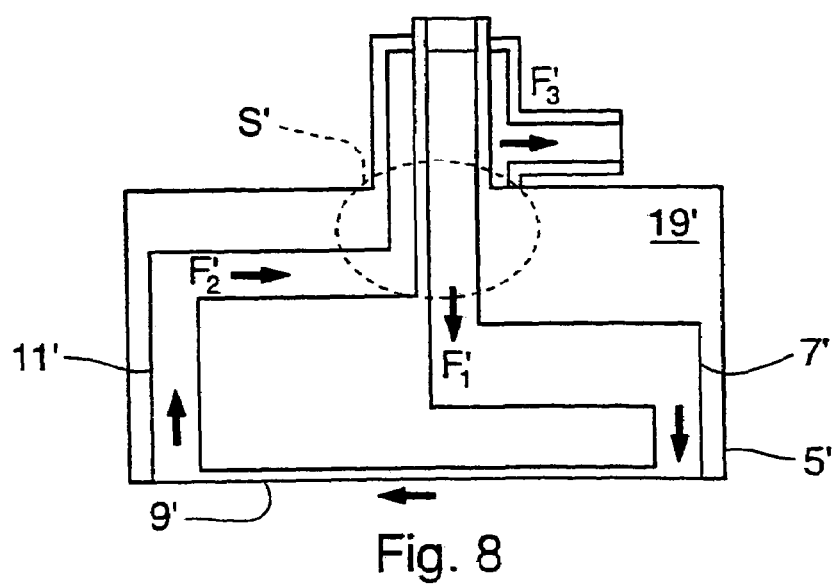
FIG. 8 shows schematically the direction of gas flows within the flow conveyor in the device shown in FIGS. 6 and 7.

As shown in FIG. 8, according to the second embodiment heat of the outgoing gas flow may possibly be recovered in order to preheat the incoming gas flow.

Similarly to what has been described with reference to the first embodiment, a gas flow at ambient temperature is taken from the outside environment and is directed against permeable membrane 3 via inlet duct 7' (arrow $F_1'$). Then, the gas flow, passing through diffuser 9', flows over the surface the selectively permeable to the test gas membrane, which is at much higher temperature. Eventually, the gas flows along outlet duct 11' (arrow $F_2'$) to be subsequently exhausted to the outside environment (arrow $F_3'$).

As shown in FIG. 8, a flange 19' is superimposed the flow conveyor 5'. Inside the flange, a portion of outlet duct 11' is constructed so as to surround a corresponding portion of inlet duct 7' (at the region denoted by S' in FIG. 8), thus forming a counter-current heat exchanger where the outgoing gas flow transfers part of its heat to the incoming gas flow.

It is clear that the detection device described above attains the desired objects, since it allows considerably increasing the sensitivity of the selectively permeable membrane, and it entails considerably reduced energy consumption in comparison to known detectors.

It is also clear that the above description has been given by the way of example and that several variations are possible without departing from the scope of the invention.

For instance, even if the device for detecting the presence of test gas has been disclosed with reference to a homogenous membrane, it could also be associated with a composite membrane, comprising a supporting layer, ensuring structural strength and having a plurality of windows, and a thin layer of a material selectively permeable to a test gas superimposed to said supporting layer.

Moreover, the blind cavities of the selectively permeable membrane could have a shape other than that depicted; in this case, the channels, if any, of the diffuser will have correspondingly different shape, adapted to cover the cavities as efficiently as possible.

What is claimed is:

1. A device for detecting the presence of a test gas comprising:
    a vacuum chamber;
    a vacuum pump connected to said vacuum chamber;
    a membrane (3) selectively permeable to the test gas and separating at least one portion of said chamber from an outside environment;
    an electronic power supply unit connected to said vacuum pump for detecting a presence of the test gas in said chamber; and
    a flow conveyor (5; 5') facing and contacting a surface of said selectively permeable membrane (3) for guiding a gas flow along a particular path from the outside environment directly to the surface of said membrane, diffusing it over the surface of said membrane (3) and exhausting to the outside environment.

2. The device of claim 1, wherein said flow conveyor (5; 5') comprises:
    an inlet duct (7; 7') for guiding the gas flow from the outside environment towards said membrane (3);
    a diffuser (9; 9') communicating with said inlet duct (7; 7') for diffusing the gas flow over a surface of said membrane (3); and
    an outlet duct (11; 11'), communicating with said diffuser (9; 9') for exhausting the gas flow to the outside environment.

3. The device of claim 2, wherein said diffuser (9; 9') extends in a plane substantially perpendicular to an axis of said inlet duct (7; 7').

4. The device of claim 2, wherein said flow conveyor (5) comprises a conical portion (5b) having a large base (5c) coupled to a surface of said membrane (3) and a cylindrical portion (5a), which extends from and connected to a small base of said conical portion (5b).

5. The device of claim 2, wherein said diffuser (9; 9') uniformly covers one surface of said membrane (3).

6. The device of claim 5, wherein said inlet duct (7) extends along an axis of said cylindrical portion (5a) and said conical portion (5b) of said flow conveyor;
    said diffuser (9) is formed at the large base (5c) of said conical portion (5b); and
    said outlet duct (11) extends along an external surface of said conical portion (5b) and along part of an external surface of said cylindrical portion (5a) of said flow conveyor (5).

7. The device of claim 2, wherein said diffuser comprises a plurality of channels (9'a, 9'b, 9'c ... 9'n), which begins from an end of said inlet duct (7'), extending over a surface of said membrane (3) and joins at the end of said outlet duct (11') for conforming the gas flow to the surface of said membrane.

8. The device of claim 7, wherein said membrane (3) comprises a plurality of reduced-thickness regions formed of a material permeable to said test gas, and wherein said channels (9'a, 9'b, 9'c ... 9'n) are superimposed said reduced-thickness regions.

9. The device of claim 2, further comprising a heating means (17) disposed upon said membrane for increasing its permeability and a heating device (13) disposed within said inlet duct (7; 7') for preheating the gas flow.

10. The device of claim 9, wherein
    at least a portion of said outlet duct (11; 11') surrounds at least a portion of said inlet duct (7; 7') and is coaxial therewith, and
    a direction of the gas flow in said at least the portion of said outlet duct (11; 11') is opposed to a direction of the gas flow in said at least the portion of said inlet duct (7; 7').

11. The device of claim 9, wherein a portion of said flow conveyor (5; 5') between inlet duct (7; 7') and outlet duct (11; 11') is made of a material with limited thermal conductivity.

12. The device of claim 9, wherein at least a portion of said outlet duct (11; 11') is formed adjacent to at least a portion of said inlet duct (7; 7')

13. The device of claim 12, wherein said at least the portion of said outlet duct (11; 11') and said at least the portion of said inlet duct (7; 7') are parallel to each other, and
    a direction of the gas flow in said at least the portion of said outlet duct (11; 11') is opposed to a direction of the gas flow in said at least the portion of said inlet duct (7; 7').

14. A method of detecting the presence of a test gas comprising the steps of:
    providing a vacuum chamber associated with a vacuum pump and a pump power supply;
    separating at least one portion of said chamber from an outside environment by a membrane (3) selectively permeable to the test gas;
    providing a flow conveyer, with an inlet duct, a diffuser and an outlet duct;
    disposing the diffuser of said flow conveyer in communication with the inlet duct and facing and contacting a surface of the membrane;
    reducing pressure within said chamber to a lower pressure than a pressure of the outside environment by means of said vacuum pump;
    guiding a gas flow from the outside environment along a particular path directly onto the surface of the membrane by forcing it successively though the inlet duct to the diffuser, diffusing the gas flow over the surface of the membrane and exhausting it via the outlet duct; and
    detecting changes in the electric current to the vacuum pump provided by a power supply thereby indicating a presents of any test gas.

15. The method of claim 14, further comprising the steps of:
    obtaining from the current changes the amount of the test gas that has passed through the membrane; and
    obtaining from the amount of the test gas that has passed through said membrane the amount of the test gas present in the environment to be tested.

16. The method of claim 14, wherein the membrane is heated to increase its permeability to the test gas.

17. The method of claim 14, wherein the gas flow is uniformly diffused over the whole surface of said membrane (3).

18. The method of claim 14, wherein the membrane (3) comprises regions highly permeable to the test gas and regions scarcely permeable to the test gas and wherein the gas flow is selectively conveyed onto said regions highly permeable to the test gas.

19. The method of claim 14, further comprising the step of preheating said gas flow before conveying it towards said membrane (3).

20. The method of claim 19, further comprising the step of at least partly recovering heat from an outgoing gas flow that has flowed over the surface of said membrane and transferring it to an incoming gas flow.

* * * * *